(12) United States Patent
Gee et al.

(10) Patent No.: US 6,465,568 B1
(45) Date of Patent: Oct. 15, 2002

(54) ANIONIC AND CATIONIC SILICONE EMULSIONS

(75) Inventors: Ronald Paul Gee; Burt Michael Wrolson, both of Midland; Brett Lee Zimmerman, Birch Run, all of MI (US)

(73) Assignee: Dow Corning Corporation, Midland, MI (US)

( * ) Notice: Subject to any disclaimer, the term of this patent is extended or adjusted under 35 U.S.C. 154(b) by 107 days.

(21) Appl. No.: 09/659,813

(22) Filed: Sep. 11, 2000

(51) Int. Cl.$^7$ .............. C08L 83/00; C08K 5/41; B01F 3/08
(52) U.S. Cl. .............. 524/837; 524/745; 524/588; 516/58; 516/66; 516/924
(58) Field of Search .............. 524/588, 837, 524/745; 516/58, 67, 924, 928, 66; 523/313

(56) References Cited

U.S. PATENT DOCUMENTS

| | | | |
|---|---|---|---|
| 2,891,920 A | 6/1959 | Hyde et al. | 524/837 |
| 3,294,725 A | 12/1966 | Findlay et al. | 524/837 |
| 4,824,877 A | 4/1989 | Glover et al. | 523/221 |
| 4,999,398 A | 3/1991 | Graiver et al. | 524/837 |
| 5,726,270 A | 3/1998 | Craig | 528/23 |
| 6,235,834 B1 * | 5/2001 | Gee et al. | 524/837 |
| 6,316,541 B1 * | 11/2001 | Gee | 524/837 |

FOREIGN PATENT DOCUMENTS

EP 0459500 B1 3/1997 .......... C08G/77/10

OTHER PUBLICATIONS

Journal of Polymer Science, Part C, No. 27, pp. 27–34, (1969) "Anionic Emulsion Polymerization of Siloxanes," Weyenberg et al., Month unknown.
Emulsion Polymerization and Emulsion Polymers, John Wiley Sons, p. 46, (1997), Month unknown.
Emulsion Polymerization, A Mechanistic Approach, Robert G. Gilbert, Academic Press Limited, pp. 51–55, (1995), Month unknown.
Encyclopedia of Emulsion Technology, vol. I, Marcel Dekker Inc., pp. 64–67, (1983), Month unknown.

\* cited by examiner

Primary Examiner—Daniel S. Metzmaier
(74) Attorney, Agent, or Firm—Jim L. De Cesare

(57) ABSTRACT

Emulsions and microemulsions containing particles of siloxane polymers are prepared by an emulsion polymerization process involving (i) the formation of a mixture by combining a siloxane oligomer, an ionic surfactant, no nonionic surfactant, and water; (ii) agitating the mixture without using high shearing forces (homogenization) to form droplets of oligomer prior to polymerization that have an average diameter of greater than 10 micron/10,000 nanometer; (iii) adding a siloxane polymerization catalyst to the oligomer mixture; (iv) agitating the mixture without using high shearing forces; (v) polymerizing the oligomer to form new particles of polymer; and (vi) continuing step (v) until the polymer has increased in viscosity or molecular weight.

6 Claims, No Drawings

ANIONIC AND CATIONIC SILICONE EMULSIONS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is directed to a method of emulsion polymerization of siloxane oligomers in which the particle size of siloxane polymer formed in the emulsion can be decreased by decreasing the amount or concentration of ionic surfactant, i.e., anionic surfactant or cationic surfactant, used in preparing the emulsion.

In particular, the invention is directed to a method of emulsion polymerization of siloxane oligomers in which the size of the siloxane polymer particles formed in the emulsion is controlled by the aqueous phase concentration of ionic surfactant and electrolytes, and by the reaction temperature. Narrow uniform particle size distribution emulsions and microemulsions are produced. According to the method, decreasing the aqueous phase concentration of ionic surfactant results in decreased size of siloxane polymer particle formed during emulsion polymerization. Contrary to current understanding, the method of the invention enables one skilled in the art to decrease the particle size of siloxane polymer formed in the emulsion by decreasing, rather than increasing, the amount or concentration of ionic surfactant used in preparing the emulsion.

BACKGROUND OF THE INVENTION

The production of aqueous silicone emulsions is commonly practiced by one of three general methods. One method is the emulsification of previously formed organosiloxane polymers by use of surfactants, and the application of shearing forces by a mechanical means, i.e., mechanical emulsification. A second method is the suspension polymerization of reactive oligomeric organosiloxanes that involves the mechanical emulsification of the organosiloxane oligomers, followed by polymerization of the oligomer in the emulsion particles to higher molecular weight organopolysiloxanes. In this second method, often referred to as suspension polymerization, the organosiloxane oligomers are not capable of diffusion into or through water, because they are too high in molecular weight to have any solubility in water. A characteristic of suspension polymerization is that the emulsion particle size is achieved during the mechanical emulsification step and does not change during the polymerization process.

The third method is known as emulsion polymerization, and it utilizes organosiloxane precursors, typically cyclosiloxanes or alkoxysilanes, which are compositions capable of diffusion into or through water in their original form or when hydrolyzed. In the process of silicone emulsion polymerization, siloxane polymers are formed from the starting siloxane precursors, and new emulsion particles are formed which contain the siloxane polymers formed in the polymerization process. The new particles are characteristically smaller than the starting droplets of organosiloxane precursor.

A key component enabling reactions to occur in silicone emulsion polymerization is a surface active catalyst which has both the properties of a surfactant and a catalyst, described in the literature generally as a surfactant-catalyst. It is sometimes described as surfcat for the sake of brevity. Surfcats may be formed in situ in the emulsion polymerization process by ion exchange of a strong acid or base catalyst and an ionic surfactant that is the salt of a surface active strong acid or base, respectively. They can also be prepared beforehand by ion exchange of a strong acid or base catalyst and an ionic surfactant that is the salt of a surface active strong acid or base, respectively, in an aqueous solution.

However, little is known about factors that may control particle formation, size, and size distribution in silicone emulsion polymerization. For example, the *Journal of Polymer Science*, Part C, No. 27, Pages 27–34, (1969), in an article entitled Anionic Emulsion Polymerization of Siloxanes, Weyenberg et al describe the process in some detail, using cyclosiloxanes or alkyltrimethoxysilanes with dodecylbenzene sulfonic acid (DBSA) as the surfcat. The authors document that increasing the concentration of DBSA results in smaller size particles of methylsilsesquioxanes when using methyltrimethoxysilane, but the effect when using cyclosiloxanes is not described.

In this regard, however, it is generally believed by those skilled in the art, that increasing surfactant concentration relative to the material being emulsified, by whatever means, generally results in formation of smaller size particles. This view is also held by those skilled in emulsion polymerization in particular. For example, in organic free-radical emulsion polymerization, it has been shown that particle number is directly proportional to surfactant concentration, and reference may be had to standard texts such as *Emulsion Polymerization and Emulsion Polymers,* John Wiley & Sons, Page 46, (1997), Edited by Peter Lovell and Mohamed El-Aasser. As particle number increases for a given amount of dispersed phase, particle size consequently decreases.

Organic free radical emulsion polymerization and silicone emulsion polymerization are similar in many respects, although one significant difference is that the former process uses a free radical initiator which is gradually consumed during the polymerization, and the latter process uses a surfcat as described above which is not consumed.

In organic free radical emulsion polymerization, there are three process intervals, each having different characteristic mechanisms, and reference may be had, for example, to such standard texts as *Emulsion Polymerization—A Mechanistic Approach,* Robert G. Gilbert, Academic Press Limited, Pages 51–55, (1995). As noted in such texts, the three process intervals are (1) a period of particle formation (Interval I), (2) a period of increasing particle size with no formation of new particles (Interval II), and (3) a period of polymer growth with no change in particle size and number (Interval III). Generally, Interval I is brief and most of the polymerization occurs in Intervals II and III. During Interval I, surfactant concentration in the aqueous phase is greater than the critical micelle concentration (CMC) of the surfactant in water. Interval I ends when the surfactant concentration becomes less than the CMC. Interval II ends when the starting reactant droplets are completely consumed.

There is limited knowledge in organic free-radical emulsion polymerization about the factors that control particle formation, size, and size distribution in Interval I. Although the reaction chemistry is different, the three Intervals I–III also occur in silicone emulsion polymerization. Typical silicone emulsion polymerizations pass through the three periods, and the particle formation period of Interval I is generally brief. Control of the size of particles being formed is not well understood, however.

It is believed that in the present invention, a method has been discovered whereby the duration of the particle formation period, Interval I, is extended to be the entire or predominate process during emulsion polymerization of cyclosiloxanes, and that the size of particles formed is controlled by certain operating parameters. Accordingly, in terms of the present invention, it is possible to control the size of silicone polymer particles being formed during silicone emulsion polymerization.

It should be noted that silicone emulsion polymerization methods were first described by Hyde and Wehrly in U.S. Pat. No. 2,891,920 (Jun. 23, 1959), and then by Findlay and Weyenberg in U.S. Pat. No. 3,294,725 (Dec. 27, 1966). Both US Patents specify that the organosiloxane precursor be emulsified to carry out the process, except in the case of alkoxysilanes which become very water soluble upon hydrolysis. Neither patent discloses a method to make polydiorganosiloxane microemulsions.

U.S. Pat. No. 4,999,398 (Mar. 12, 1991) discloses a method of making polydiorganosiloxane microemulsions by sequentially adding at an effective rate a standard emulsion of a cyclosiloxane, surfactant, and water, to a polymerization medium of water and a polymerization catalyst, to form a clear, stable, microemulsion having an average particle size less than 0.15 micron. Comparison examples are present in the 398 patent where the cyclosiloxane is not first emulsified prior to beginning emulsion polymerization. Such examples illustrate the failure to achieve clear microemulsions without the cyclosiloxane emulsification step. Each method requires emulsification of the starting siloxane reactant to successfully produce the desired siloxane polymer emulsion or microemulsion.

U.S. Pat. No. 5,726,270 (Mar. 10, 1998) describes a process of making polysiloxane emulsions having an essentially mono-modal particle size in the size range of about 50 nanometer to about 2 micron, by feeding over a periods up to 24 hours, an aqueous mixture of siloxane precursor and an acid catalyst-surfactant to a pre-heated aqueous reaction medium optionally containing one or more surfactants. According to the '270 patent, it is not necessary for the mixture to be an emulsion, but that is preferred, since all examples other than one example in the '270 patent use a pre-emulsion; and that one example uses two separate feeds, a siloxane feed and an aqueous acid catalyst-surfactant solution feed. Many examples in the '270 patent evidence severe mixing problems due to high emulsion viscosity, and in some examples, it was not possible to complete the addition of the pre-cursor emulsion to the reaction medium. According to the '270 patent, one particularly significant aspect of its method is control of the amount of acid catalyst present, and this is accomplished by maintaining a generally constant ratio of the siloxane precursor to the acid catalyst-surfactant, while the siloxane precursor is added to the reaction medium.

Although the '270 patent indicates that mono-modal particle size emulsions are advantageous to permit higher silicone concentration emulsions at workable emulsion viscosities, this is not the case as taught in U.S. Pat. No. 4,824,877 (Apr. 25, 1989). At equal concentrations of oil phase and surfactants, the viscosity of an emulsion of broad particle size distribution is lower than a mono-disperse emulsion. While emulsion viscosity can be an important factor, it is of greater importance that the emulsion be essentially free of unemulsified oil such as the polysiloxane, so that the oil remains dispersed in the emulsion, for the generally accepted reasons of product uniformity, and prevention of problems associated with oiling out on the surfaces of containers and pipes.

European Patent 459,500 (Mar. 5, 1997) discloses a silicone emulsion polymerization method that solves many of the problems discussed above, and the '500 patent provides a viable avenue to methods of making stable, oil free polysiloxane emulsions by emulsion polymerization. The method of the '500 patent eliminates the need of a pre-emulsification step, it avoids mixing difficulties due to high emulsion viscosity during polymerization, and it provides a means of controlling the size of polymer particles produced over a large range, i.e., greater than about 10 nanometer, in particular, 25 nanometer to about 1200 nanometer.

The method described in the '500 patent basically involves the steps of (A) preparing a mixture of (i) one or more cyclic siloxanes, (ii) one or more nonionic surfactants, (iii) one or more ionic surfactants, (iv) water, and (v) a siloxane polymerization catalyst, and in which the cyclic siloxane is not mechanically pre-emulsified before it is added to mixture (A); and (B) thereafter heating and agitating the mixture at a polymerization reaction temperature until essentially all of the cyclic siloxane is reacted, and a stable oil-free emulsion is formed.

By controlling certain operational parameters in the method of the '500 patent, one is able to produce an emulsion of a specific type, i.e., a standard emulsion, a fine emulsion, or microemulsion, and also produce a desired particle size in the resulting emulsion. These operational parameters include (i) the reaction temperature, (ii) the amount and type of ionic surfactant, (iii) the amount and type of nonionic surfactant, (iv) the amount of water, (v) the amount of catalyst, and (vi) the presence of optional ingredients such as an alcohol.

Thus, it has been found that increasing the reaction temperature of the mixture in the emulsion polymerization facilitates production of larger size emulsion polymer particles. Increasing the amount of the ionic surfactant present during the emulsion polymerization facilitates production of smaller size emulsion polymer particles. Increasing the amount of the nonionic surfactant present during the emulsion polymerization facilitates production of larger size emulsion polymer particles.

The effect of the nonionic surfactant was quite unexpected, and it is believed that the nonionic surfactant functions to make the particles being formed less stable, and consequently they aggregate to a larger size before becoming stabilized by the ionic repulsion provided by the ionic surfactant.

In the method of the '500 patent, the presence of the nonionic surfactant is required during the emulsion polymerization process, as well as use of the operating parameters (i) to (v). The use of a nonionic surfactant in the '500 patent has two disadvantages. One disadvantage is that nonionic surfactants are known to retard the reaction rate in silicone emulsion polymerization, and this causes an increase in processing time. The second disadvantage is that nonionic surfactants that are susceptible to decomposition by hydrolysis by strong acids or strong bases generally cannot be used in that method.

However, there still exists a need for improved silicone emulsion polymerization methods to reduce manufacturing costs and production time, to improve control of particle size and emulsion viscosity during emulsion polymerization, and to provide added flexibility in formulation of silicone emulsions for various market applications.

Conventional wisdom dictates that at least one viable avenue for achieving a smaller particle size of the siloxane polymer formed in an emulsion prepared by the emulsion polymerization of siloxane oligomers is to increase the amount or concentration of the ionic surfactant used in preparing the emulsion. Reference may be had, for example, to the '500 patent wherein the patentee Gee states:

"It has also been found when using the method of the instant invention, that increasing the amount of the ionic surfactant decreases the particle size of the polysiloxane. The ionic surfactant present during the polymerization reaction appears to have the greatest effect on the particle size. Additional ionic surfactant added in the latter part of the polymerization reaction, just prior to or after neutralization, does not appear to greatly affect the particle size. Additional ionic surfactant is optionally added in the latter part of the polymerization reaction as a means for minimizing viscosity. It is possible to have equivalent amounts of ionic surfactant present in the final emulsion yet produce different particle sizes. This can be achieved by adding different amounts of ionic surfactant during the polymerization reaction and adding any additional amounts in the latter part of the polymerization reaction or just prior to neutralization. High levels of the ionic surfactant present during the polymerization reaction will often result in incomplete reactions and the failure to produce an oil-free emulsion. Levels of ionic surfactant which are too small may also cause similar effects. Those skilled in the art will be able to readily determine the levels of ionic surfactant needed to produce the desired emulsion".

The patentee Gee explains further that:

"The type of ionic surfactant used in forming the emulsion can also effect the particle size of the polysiloxane. Ionic surfactants can be classified by their hydrophilicity (HLB) or by the number of carbons in the alkyl group of the surfactant. By choosing an ionic surfactant with a higher degree of hydrophilicity and holding all other operational parameters constant, a larger particle size will result in the emulsion formed. A higher degree of hydrophilicity is often associated with shorter alkyl chains. An ionic surfactant with a lower degree of hydrophilicity will result in an emulsion with a smaller particle size. It is preferred to use ionic surfactants having an alkyl chain containing 8 or more carbon atoms".

Quite unexpectedly, however, it has been discovered that, contrary to this conventional wisdom, one can achieve a smaller particle size of siloxane polymer formed in emulsions prepared by emulsion polymerization, by decreasing rather than increasing, the amount or concentration of ionic surfactant used in their preparation.

BRIEF SUMMARY OF THE INVENTION

This invention is directed to a method of preparing emulsions which provides unexpected benefits, but which is subject to some limitations for achieving the benefits.

One limitation is that no high shear mixing such as homogenization is used during the process. Another limitation is that no nonionic surfactant is used in the process, i.e., nonionic surfactant free. The remaining limitation is that the particle size of unreacted siloxane oligomer prior to its polymerization in the process is greater than 10 micron/10,000 nanometer.

The method purposely avoids emulsification of the starting siloxane oligomer to minimize reaction at the surface of siloxane oligomer emulsion particles due to the high interfacial surface area created by emulsification. It is believed such particles constitute a distinct population of particles that are not completely consumed and can result in a broad or multi-modal particle size distribution after emulsion polymerization. It is also believed that siloxane particles form by polymerization and precipitation of siloxane oligomers in the aqueous phase to form stable polymer particles. The size of the siloxane polymer particles formed is controlled by the reaction temperature, the aqueous phase concentration of ionic surfactant and electrolytes, and the structure of the ionic surfactant.

The unexpected benefits of the invention are (i) the precise control of the size of silicone polymer particles in emulsions and microemulsions produced by emulsion polymerization; (ii) the ability to decrease, rather than to increase, the surfactant content while maintaining a given polymer particle size; (iii) increased formulation flexibility by not using a nonionic surfactant during emulsion polymerization; and (iv) the optional ability to utilize hydrolyzable nonionic surfactants by post addition after emulsion polymerization is complete.

These and other features and benefits of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

Generally, the method of this invention is an improvement over methods described in the European Patent 459,500 discussed above. In particular, the invention provides a method to produce an essentially oil free silicone emulsion or microemulsion of controlled particle size that requires no pre-emulsion of the cyclic siloxane, and which does not use a nonionic surfactant during the emulsion polymerization. An additional feature is that it also does not require any semi-continuous adding or feeding of a siloxane precursor or catalyst-surfactant, i.e., surfcat, to the reaction medium, as in the methods described in U.S. Pat. No. 5,726,270 also discussed above.

As a consequence, the starting siloxane droplets are not pre-emulsified, and with sufficient mixing to prevent mixture phase separation, are typically greater than about 10 micron/10,000 nanometer in size. Furthermore, a desired particle size in the resulting emulsion can be realized without the presence of a nonionic surfactant. This is unexpected as the '500 patent clearly teaches that a nonionic surfactant be present.

While it is known that an increase in the amount of ionic surfactant present during emulsion polymerization facilitates production of smaller size emulsion polymer particles, surprisingly it has now been discovered that, as the amount of ionic surfactant relative to the amount of siloxane is held constant or even decreasing, increasing ionic surfactant concentration in the water can result in larger polymer particle size, and conversely that decreasing ionic surfactant concentration in the water can result in smaller polymer particle size.

This apparent departure from conventional wisdom is believed to occur when the ionic surfactant concentration in the water becomes sufficiently high, that its contribution to the total ionic strength of the aqueous phase has a greater effect than its contribution to ionic repulsion between particles. This is based on the fact that increasing ionic strength of the aqueous phase increases the size at which unstable particles become stable, in accordance with DLVO electrical double layer theory developed by Derjaguin-Landau and Verwey-Overbeek.

One way to vary the surfactant concentration in the aqueous phase is by varying the amount of water present during the emulsion polymerization. Depending on the structure of the ionic surfactant and the concentration range of the ionic surfactant in the aqueous phase, this trend can be one of increasing or decreasing particle size. It is believed that each ionic surfactant has a characteristic lower concentration range from greater than zero to a certain concentration ($C_{max}$), where increasing concentration in the water phase during emulsion polymerization results in a smaller polymer particle size due to ionic repulsion effects; and a characteristic upper concentration range at concentrations greater than Cmax, where increasing concentration in the water phase results in a larger polymer particle size, apparently due to greater effect of increasing ionic strength rather than ionic repulsion.

The presence of ionic salts such as sodium chloride during emulsion polymerization can be detrimental to achieving reductions in particle size, as their presence results in the formation of larger size polymer particles, apparently due to increasing ionic strength of the aqueous phase, and a compression of the thickness of the electrical double layer on the particles. Electrolytes or salts whose counter-ions relative to the surface active ion of the surfcat have a higher charge number, have a greater effect on increasing the size of particles being formed, and reference may be had to Table 4 appearing below.

While the '500 patent teaches that increasing the reaction temperature generally results in the formation of larger size polymer particles, it has now been found that in some instances, progressively higher temperatures may result in smaller size particles, or may even result in a reversal in the trend in the size of the particles produced. Maintaining a constant reaction temperature during the emulsion polymerization generally results in a narrow particle size distribution, and conversely, wide variations in temperature during the reaction result in broad or even multi-modal particle size distribution.

Thus, the present invention is for an emulsion polymerization process for preparing stable oil free emulsions containing particles of siloxane polymer which involves the preparation of a mixture (I) from (a) a cyclosiloxane or mixture of cyclosiloxanes, (b) an ionic surfactant or mixture of ionic surfactants, (c) no nonionic surfactant, (d) water, and (e) a siloxane polymerization catalyst, with the proviso that the cyclosiloxane is not mechanically pre-emulsified before addition to mixture (I), and with the further proviso that prior to, or at the point of, contact with the catalyst, the cyclosiloxane is present in the mixture (I) as droplets having an average diameter greater than 10 micron/10,000 nanometer.

According to the method, mixture (I) is then maintained at the emulsion polymerization reaction temperature necessary to obtain the desired polymer particle size prior to, or at the time, when the catalyst and cyclosiloxane both become present in mixture (I) and come in contact with each other. Thereafter, mixture (I) is heated and agitated at the emulsion polymerization reaction temperature, until essentially all droplets of siloxane oligomer are consumed by the polymerization reaction and an emulsion of siloxane polymer particles is formed.

Although one feature of the invention resides in the omission of a nonionic surfactant during the emulsion polymerization process, they may be post-added after the process is completed, if desired, for other purposes such as to enhance emulsion wetting ability on various substrates. This flexibility allows the use of hydrolyzable nonionic surfactants such as ethoxylated fatty acid esters and glyceryl esters of fatty acids.

Since another feature of the invention resides in not using a cyclosiloxane emulsion, it should be understood that for purposes of this invention, the term cyclosiloxane emulsion is intended to mean an emulsion of cyclosiloxanes formed by subjecting a mixture of one or more surfactants, water, and cyclosiloxane, to high-shear mixing, such as with violent mechanical agitation, ultrasonic vibration, a colloid mill, a rotor/stator mixer, or an homogenizer. Homogenization is understood in its classical sense which consists in the use of a positive displacement pump and a homogenizing valve, in which the pump, usually a plunger or piston, forces a fluid into the homogenizing valve. Examples of high-shear mixing equipment are known, and reference may be had, for example, to a standard text such as the *Encyclopedia of Emulsion Technology*, Volume I, Marcel Dekker Inc., edited by Paul Becher, Pages 64–67, (1983). The particle size of such cyclosiloxane emulsions is generally sub-micron.

In contrast, and according to the present invention, the suspended cyclosiloxane droplets are at least 10 micron/10,000 nanometer in size. Therefore, the droplets are relatively unstable, rising at a relatively high velocity in the absence of agitation, and undergo coalescence to larger droplets, and usually the formation of a separate layer over the water phase. Additionally, the interfacial area is relatively low. In spite of this low interfacial area, the rate of polymerization as taught within the present invention is surprisingly high. This high polymerization rate is unexpected in light of the teachings of U.S. Pat. No. 3,294,725.

Furthermore, although U.S. Pat. No. 5,726,270 teaches those skilled in the art that it is necessary to maintain a constant ratio of anionic catalyst-surfactant to silicone monomer to synthesize mono-modal aqueous dispersions of polysiloxanes, according to the present invention, this requirement is not necessary. Mono-modal emulsions and microemulsions of polysiloxane can be prepared with a constant or a variable ratio of anionic surfactant to silicone monomer during emulsion polymerization.

Therefore, using no high-shear mixing, no nonionic surfactant, and starting with a particle size of the unreacted siloxane oligomer prior to its polymerization of greater than 10 micron/10,000 nanometer, emulsions according to this invention are prepared by simply mixing together the siloxane oligomer, an anionic surfactant, a catalyst, and water.

The polymerization process involves opening of the ring of the cyclic siloxane oligomer using an acid or a base catalyst in the presence of water. Upon opening of the ring, polysiloxanes with terminal hydroxy groups are formed. These polysiloxanes then react with each other through a condensation reaction to form siloxane polymers. A simplified representation of the process is shown below for octamethylcyclotetrasiloxane in which Me is $CH_3$: $(Me_2SiO)_4$+$H_2O$+Catalyst→$HOMe_2SiOMe_2SiOMe_2SiOSiMe_2OH$→$HOMe_2SiOMe_2SiOMe_2SiOSiMe_2OH$+$HOMe_2SiOMe_2SiOMe_2SiOSiMe_2OH$→$HOMe_2SiO(Me_2SiO)_6SiMe_2OH$+$H_2O$. Polymers of higher molecular weight are obtained by allowing this process to continue.

Generally, siloxane oligomers suitable for this process are cyclic monomers of the formula

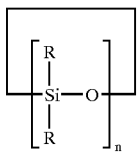

where each R is a saturated or unsaturated alkyl group of 1–6 carbon atoms, an aryl group of 6–10 carbon atoms, and n is 3–7. R can optionally contain a functional group which is unreactive in the ring opening and polymerization reaction.

Suitable R groups are methyl, ethyl, propyl, phenyl, allyl, vinyl, and —R'F. R' is an alkylene group of 1–6 carbon atoms or an arylene group of 6–10 carbon atoms, and F is a functional group such as amine, diamine, halogen, carboxy, or mercapto. R can also be —R'F'R where R' and R are described above and F' is a non-carbon atom such as oxygen, nitrogen, or sulfur.

Cyclic siloxanes most useful as oligomers in this invention include such oligomers as hexamethylcyclotrisiloxane, octamethylcyclotetrasiloxane (D4), decamethylcyclopentasiloxane (D5), tetramethyltetravinylcyclotetrasiloxane, tetramethyltetraphenylcyclotetrasiloxane, and mixtures thereof.

In addition to the cyclic siloxane, mixture (I) can also contain alkoxysilanes represented by $R''Si(OR''')_3$ or $(R'''O)_4Si$ where R'' is an organic group containing 1–12 carbon atoms such as an unsubstituted alkyl group $C_aH_{2a+1}$ or an aryl group. R''' in the hydrolyzable group —(OR''') is an alkyl group containing 1–6 carbon atoms. Most preferred silanes $R'''Si(OR''')_3$ are alkoxysilanes with neutral organic groups R'''.

The tetraalkoxysilanes $(R'''O)_4Si$ are exemplified by tetramethoxysilane, tetraethoxysilane, tetrapropoxysilane, and tetrabutoxysilane.

Hydrolyzable water-soluble or partially pre-hydrolyzed alkoxysilanes $R''Si(OR''')_3$ with neutral organic groups R'' are exemplified by methyltrimethoxysilane (MTM), methyltriethoxysilane, ethyltrimethoxysilane, propyltrimethoxysilane, n-butyltrimethoxysilane, hexyltrimethoxysilane, octyltrimethoxysilane, octyltriethoxysilane, dodecyltrimethoxysilane, dodecyltriethoxysilane, and phenyltrimethoxysilane. Any alcohol generated by the hydrolysis of these types of alkoxysilanes may be removed by distillation or some other suitable means.

Hydrolyzable water-soluble alkoxysilanes $R''Si(OR''')_3$ with cationic organofunctional groups R'' exemplified by amino functional silanes can also be included, if desired.

Any anionic surfactant can be used herein, including but not limited to, sulfonic acids and their salt derivatives. Some representative examples of anionic surfactants are alkali metal sulfosuccinates; sulfonated glyceryl esters of fatty acids such as sulfonated monoglycerides of coconut oil acids; salts of sulfonated monovalent alcohol esters such as sodium oleyl isethionate; amides of amino sulfonic acids such as the sodium salt of oleyl methyl tauride; sulfonated products of fatty acid nitriles such as palmitonitrile sulfonate; sulfonated aromatic hydrocarbons such as sodium alpha-naphthalene monosulfonate; condensation products of naphthalene sulfonic acids with formaldehyde; sodium octahydro anthracene sulfonate; alkali metal alkyl sulfates; ether sulfates having alkyl groups of eight or more carbon atoms such as sodium lauryl ether sulfate; and alkylaryl sulfonates having one or more alkyl groups of eight or more carbon atoms such as hexadecylbenzene sulfonic acid and $C_{20}$ alkylbenzene sulfonic acid.

Commercial anionic surfactants which can be useful in this invention include dodecylbenzene sulfonic acid sold under the name BIOSOFT S-100 by Stepan Company, Northfield, Ill.; the sodium salt of dodecylbenzene sulfonic acid sold under the name SIPONATE DS-10 by Alcolac Inc., Baltimore, Md.; sodium n-hexadecyl diphenyloxide disulfonate sold under the name DOWFAX 8390 by The Dow Chemical Company, Midland, Mich.; and the sodium salt of a secondary alkane sulfonate sold under the name HOSTAPUR SAS 60 by Clariant Corporation, Charlotte, N.C.

Cationic surfactants useful in the invention include compounds containing quaternary ammonium hydrophilic moieties in the molecule which are positively charged, such as quaternary ammonium salts or bases represented by $R3R4R5R6N^+X^-$ where R3 to R6 are alkyl groups containing 1–30 carbon atoms, or alkyl groups derived from tallow, coconut oil, or soy; and X is hydroxide or halogen, i.e., chlorine or bromine. Dialkyl dimethyl ammonium salts which can be used are represented by $R7R8N^+(CH_3)_2X^-$ where R7 and R8 are alkyl groups containing 12–30 carbon atoms or alkyl groups derived from tallow, coconut oil, or soy; and X is hydroxide or halogen. Monoalkyl trimethyl ammonium salts which can be used are represented by $R9N^+(CH_3)_3X^-$ where R9 is an alkyl group containing 12–30 carbon atoms or an alkyl group derived from tallow, coconut oil, or soy; and X is halogen.

Representative quaternary ammonium salts and hydroxides are dodecyltrimethyl ammonium chloride/lauryltrimethyl ammonium chloride (LTAC), cetyltrimethyl ammonium chloride (CTAC), didodecyldimethyl ammonium bromide, dihexadecyldimethyl ammonium chloride, dihexadecyldimethyl ammonium bromide, dioctadecyldimethyl ammonium chloride, dieicosyldimethyl ammonium chloride, didocosyldimethyl ammonium chloride, dicoconutdimethyl ammonium chloride, ditallowdimethyl ammonium chloride, ditallowdimethyl ammonium bromide, and cetyltrimethyl ammonium hydroxide. These and other quaternary ammonium salts are commercially available under names such as ADOGEN, ARQUAD, TOMAH, and VARIQUAT.

Any catalyst capable of polymerizing cyclic siloxanes in the presence of water is useful in the method. Catalysts include siloxane polymerization catalysts capable of cleaving siloxane bonds represented by strong acids such as substituted benzene sulfonic acids, aliphatic sulfonic acids, hydrochloric acid, and sulfuric acid. Some anionic surfactants such as dodecylbenzene sulfonic acid can perform the function of an acid catalyst in addition to performing the function of a surfactant, in which case, a separate catalyst is not required. Acid catalysts such as hydrochloric acid and sulfuric acid that are not also surfactants convert the anionic surfactant to an acid by in situ ion exchange of $H^+$ for the surfactant cation, i.e., typically $Na^+$. The anionic surfactant may also be converted to acid form by ion exchange prior to use in the emulsion polymerization process. Cation exchange resins are useful for this purpose.

Other representative siloxane polymerization catalysts include strong bases such as quaternary ammonium hydroxides, and metal hydroxides such as sodium hydroxide and lithium hydroxide. Some examples of suitable quaternary ammonium hydroxides are octadecyltrimethyl ammonium hydroxide, hexadecyloctadecyl dimethyl ammonium hydroxide, and tallow trimethyl ammonium hydroxide. Base catalysts such as sodium hydroxide that are not also surfactants cause in situ ion exchange with quaternary ammonium salts to form quaternary ammonium hydroxides. Cationic surfactants can also be converted to base catalyst surfactants prior to use in emulsion polymerization by ion exchange, and anionic resins are useful for this purpose.

Most typically, emulsions prepared according to this invention contain a silicone polymer concentration of about 10 to 70 percent by weight of the total emulsion solution, preferably about 25 to 60 percent by weight. While emulsions containing less than about 10 percent silicone polymer content can be made, such emulsions hold little or no economic value. The siloxane oligomer can generally be used in the amount of about 1 to 60 percent by weight of the total emulsion. The ionic surfactant is generally present at about 0.05 to 30 percent by weight of the total emulsion, preferably about 0.1 to 20 percent by weight. The catalyst can be present in the reaction medium at a level generally about 0.01 to 30 percent by weight of the total amount of monomer. Strong acids or strong bases can be used within the lower end of this range, while surfactants also capable of functioning as catalysts will be present at a concentration on the higher end of the range. Water constitutes the balance of the emulsion to 100 percent.

Generally, the method of preparing emulsions according to this invention is carried out by first creating a mixture containing the siloxane oligomer, ionic surfactant, no non-ionic surfactant, and water. The mixture can then be further processed at room temperature, or it can be heated with agitation, but without high shearing force (homogenization), at a desired polymerization reaction temperature. The catalyst is added to the mixture to initiate polymerization of the oligomer, or any surfactant capable of functioning as the catalyst is activated. The polymerization is allowed to proceed until the siloxane oligomer is consumed and the siloxane polymer formed has reached the desired polymer viscosity or molecular weight.

The catalyst addition step is not necessary if the ionic surfactant is also in an acid or base form. Alternatively, the same general method is used except the initial mixture contains the catalyst, and the siloxane oligomer is added after the desired reaction temperature is established.

Polymerization reaction temperatures are typically above the freezing point, but below the boiling point of water. Pressures above or below atmospheric pressure allow operation outside of this range. At temperatures below room temperature, the polymerization reaction may proceed more slowly. The preferred temperature range is 1–95° C., most preferably 50–80° C.

The polymerization reaction can be stopped at the desired level of polymerization of the siloxane polymer by using known methods. Reaction times of less than 24 hours, typically less than 10 hours, are sufficient to achieve the desired polymer viscosity.

The methods for stopping the reaction encompass neutralization of the acid or base catalyst by addition of equal or slightly greater stoichiometric amounts of base or acid, respectively. Either a strong or weak base, or a strong or weak acid, may be used to neutralize the reaction. Care must be taken when using a strong base or a strong acid not to over neutralize, as it is possible to re-catalyze the reaction. It is preferred to neutralize with sufficient quantities of base or acid such that the resulting emulsion has a pH of greater than about 7 when an anionic surfactant is present, and a pH of less than about 7 when a cationic surfactant is present.

Some examples of neutralizing agents which may be employed include bases such as sodium hydroxide, ammonium hydroxide, potassium hydroxide, triethanolamine (TEA), triethylamine, isopropyl amine; and acids such as acetic acid and formic acid.

The addition of a preservative may be desirable since emulsions are susceptible to microbiological contamination. Some representative preservatives include compositions such as formaldehyde; 1,3-dimethylol-5,5-dimethyl hydantoin, i.e., DMDM HYDANTOIN; 5-bromo-5-nitro-1, 3-dioxane; methyl or propyl paraben; sorbic acid; imidazolidinyl urea; and KATHON CG, i.e., 5-chloro-2-methyl-4-isothiazolin-3-one.

If desired, a small quantity of an alcohol can be added to mixture (I) before or soon after catalysis to increase the particle size of the emulsion. Alcohols useful include methanol, ethanol and isopropanol. Since alcohols are typically used to break emulsions, it is preferred to keep the concentration of the alcohol at low levels, preferably below about three percent by weight. To have the greatest effect on particle size, it is preferred to have the alcohol present throughout the course of the polymerization reaction.

EXAMPLES

The following examples are set forth in order to illustrate this invention in more detail.

Example 1

Anionic Microemulsion

This example illustrates a typical procedure according to the method of this invention where the cyclosiloxane is held out of mixture (I) until mixture (I) has been heated to the desired reaction temperature.

To a 1 liter three-necked round bottom flask were added 385.0 gram (183.3 parts by weight) of water and 105.0 gram (50.00 parts) of dodecylbenzene sulfonic acid sold under the name BIOSOFT S-100 by Stepan Company, Northfield, Ill. The flask was then fitted with a glass rod/Teflon® paddle stirrer, a reflux condenser, a heating mantle, and a thermocouple attached to a temperature controller. The contents of the flask were stirred to dissolve the anionic surfactant. The stirrer was set to approximately 300 RPM, and the flask was heated to 95° C. When the temperature was stable at 95° C., 210.0 gram (100 parts) of octamethylcyclotetrasiloxane (D4) was added to the reaction medium over one hour. The flask was held at 95° C. with stirring for 4 hours. At designated times during the reaction, 5 g samples were withdrawn and immediately neutralized by adding slightly more than equimolar amounts of triethanolamine (TEA) and shaking vigorously to neutralize the catalyst in the sample. These aliquots were analyzed for percent non-volatile content, from which the extent of conversion of D4 to siloxane polymer was determined. The reaction was neutralized by adding 50 weight percent TEA (108.36 gram minus an amount to adjust for the weight of samples removed during sampling), and water (31.64 gram minus adjustment for samplings), and then cooling it to room temperature. The resulting clear microemulsion contained 25 weight percent silicone and was then analyzed for particle size on a NICOMP Model 370 Particle Sizer manufactured by Pacific Scientific Instruments USA, Grants Pass, Oreg. The particles had an average intensity weighted diameter of 0.040 micron/40 nanometer. The neutralized aliquot taken at 2 hours reaction time was clear with no remaining D4 cyclosiloxane layer or droplets, indicating that all of the starting D4 had been consumed. The percent conversion to polymer was about 88 percent. This indicated that the reaction had reached equilibrium of polymer, and a mixture of newly formed cyclosiloxanes which was predominately D4, D5, and dodecamethylcyclohexasiloxane D6, was present in the polymer particles formed by emulsion polymerization.

Example 2

Anionic Microemulsion

This example illustrates a typical procedure according to the invention where the catalyst is held out of mixture (I)

until mixture (I) has been heated to the desired reaction temperature. It also illustrates formation of a surfcat by ion exchange in situ from an anionic surfactant and mineral acid catalyst.

Weight amounts of 191.3 gram (255.07 parts) of deionized water, 25.0 gram (33.33 parts) of a 60 percent by weight solution of the sodium salt of a secondary alkane sulfonate sold under the name HOSTAPUR SAS 60 by Clariant Corporation, Charlotte, N.C., containing 20.00 parts SAS and 13.33 parts water, and 75.0 gram (100 parts) of octamethylcyclotetrasiloxane monomer D4, were added to a 500 mL, three-neck, round-bottom flask, equipped with a glass stirring rod having a TEFLON® paddle, a stopper, a condenser, and a temperature probe. The stirring mechanism was set to rotate at 300 rpm, and the temperature was adjusted to 70° C. using a temperature controller and a heating mantle. After the temperature had stabilized at 70° C., 3.0 gram (4 parts) of concentrated hydrochloric acid as a solution containing 37 percent by weight of active ingredient in water were added (1.48 parts HCl and 2.52 parts water) to catalyze the polymerization reaction. The polymerization reaction was allowed to continue for 6 hours. The contents of the flask were neutralized with 9.6 gram of triethanolamine as a solution containing 85 percent by weight of the active ingredient in water. The product was a translucent microemulsion containing a siloxane polymer with a volume-weighted mean particle size of about 0.081 micron/81 nanometer.

This experiment was repeated up to the point just prior to the addition of the HCl catalyst, and a determination was made of the droplet size of octamethylcyclotetrasiloxane in the mixture by removing a sample and immediately analyzing it using a MASTERSIZER-S Particle Size Analyzer manufactured by Malvern Instruments, Southborough, Massachusetts. The volume-weighted mean droplet size was measured to be about 50 micron/5,000 nanometer.

Example 3
Cationic Microemulsion

As in Example 2, this example illustrates a typical procedure of this invention where the catalyst is held out of mixture (I) until mixture (I) has been heated to the desired reaction temperature, and a surfcat is produced in situ from a strong base catalyst and a cationic surfactant.

To a one liter three-necked round bottom flask were added 187.04 gram (106.88 parts) of water, and 337.96 gram of ARQUAD 16–29, which is a cationic surfactant containing 29 percent cetyltrimethyl ammonium chloride in water, a product and name of Akzo Chemicals Inc., Chicago, Ill. The flask was fitted with a glass rod/Teflon® paddle stirrer, a reflux condenser, a heating mantle, and a thermocouple attached to a temperature controller. The contents of the flask were stirred to dissolve the surfactant. The stirrer was set to approximately 300 RPM, 175.0 gram (100 parts) of octamethylcyclotetrasiloxane D4 were added to the flask, and the flask was heated to 95° C. When the temperature was stable at 95° C., 2.10 gram of 50 percent NaOH (0.60 parts NaOH and 0.60 parts water) were added to the flask to catalyze the reaction. The flask was held at 95° C. with stirring for 3 hours. At designated times during the reaction, 5 g samples were withdrawn and immediately neutralized by adding 0.06 gram of a 20 percent aqueous acetic acid solution and shaking vigorously. These aliquots were analyzed for percent non-volatile content, from which the extent of conversion of D4 to siloxane polymer was determined. The percent conversion to the polymer was about 88 percent after the elapse of only 0.5 hours of reaction time. This indicated a fast reaction even though the D4 cyclosiloxane reactant was not emulsified. The reaction was neutralized by adding dilute acetic acid and water, the amounts of which were adjusted for the weight of emulsion removed during sampling, and the contents were cooled to room temperature. The resulting clear microemulsion was then analyzed for particle size on the NICOMP model 370 Particle Sizer. The particles had an average intensity weighted diameter of 0.030 micron/30 nanometer. The microemulsion was also analyzed for particle size on a Microtrac UPA 150 Particle Sizer and determined to have an average intensity weighted diameter of 0.030 micron/30 nanometer, a volume average diameter (Dv) of 0.0234 micron/23.4 nanometer, a number average diameter ($D_n$) of 0.0193 micron/19.3 nanometer, and a $D_v/D_n$ of 1.21, indicating it had a narrow particle size distribution, i.e., monomodal.

Examples 4 to 8
Anionic Emulsions

Examples 4–8 illustrate the effect of reaction temperature on the size of polymer particles produced by the method of the invention, and the effect can be seen in Table 1, i.e., the size of particles formed during the reaction increased as the reaction temperature increased.

Each example used the same formulation and followed the same procedure as Example 1, except that the reaction temperature was different for each example as shown in Table 1. Examples 4 and 5 were neutralized after one hour. Analysis for conversion to polymer was about 88 percent indicating that the reaction was complete. Trace amounts of a second larger particle size population caused lower clarity expressed as percent transmittance, however. Particle size was measured using the NICOMP model 370 Particle Sizer in Distribution Analysis Volume weighted mode for consistency. Example 4 was determined to be bimodal with a small population of larger particles.

TABLE 1

| | Example | | | | | |
|---|---|---|---|---|---|---|
| | 4 | 5 | 6 | 7 | 8 | 1 |
| Temp. ° C. | 70 | 75 | 80 | 85 | 90 | 95 |
| Particle size nanometer | 19 | 24 | 27 | 28 | 33 | 35 |
| Percent Transmittance | 76 | 73 | 96 | 95 | 89 | 86 |
| Appearance | Clear, viscous | Clear, viscous | Clear, thin | Clear, thin | Clear, thin | Clear, thin |

Examples 9 to 12, 1, 13, and 14
Anionic Emulsions

Table 2 illustrates the effect of varying the water content in the reaction mixture to control the size of polymer particles produced.

Each Example 9–14 followed the same procedure using the reaction temperature as in Example 1, but the formulations were different for each example as shown in Table 2. Particle size was measured using the NICOMP model 370 Particle Sizer in Distribution Analysis Volume weighted mode for consistency, and in the Intensity weighted Gaussian analysis mode, as each example contained only one population of particles in Gaussian distribution.

These examples show that an increase of the amount of water in mixture (I) results in the formation of smaller size particles during the reaction. In each case, the concentration of the surfcat relative to the D4 cyclosiloxane was held constant. The increase of the amount of water it is noted decreases the concentration of the surfcat in the water phase.

TABLE 2

| | Example | | | | | | |
|---|---|---|---|---|---|---|---|
| | 9 | 10 | 11 | 12 | 1 | 13 | 14 |
| Weight D4, gram | 175.0 | 140.0 | 70.0 | 210.0 | 210.0 | 140.0 | 70.0 |
| Weight DBSA, gram | 175.0 | 140.0 | 70.0 | 120.0 | 105.0 | 70.0 | 21.0 |
| Weight water, gram | 350.0 | 420.0 | 560.0 | 270.0 | 385.0 | 490.0 | 609.0 |
| Wt. Parts D4 | 100 | 100 | 100 | 100 | 100 | 100 | 100 |
| Wt. Parts DBSA | 100 | 100 | 100 | 57.14 | 50 | 50 | 50 |
| Wt. Parts Water | 200 | 300 | 800 | 128.6 | 183.3 | 350 | 850 |
| Ratio DBSA/D4 | 1.00 | 1.00 | 1.00 | 0.57 | 0.50 | 0.50 | 0.50 |
| % DBSA in water phase | 33.3 | 25 | 11 | 31 | 21 | 12.5 | 5.6 |
| Particle size, nm | | | | | | | |
| Volume mode | 61 | 41 | 28 | 59 | 35 | 25 | 29 |
| Intensity mode | 65 | 45 | 29 | 62 | 40 | 27 | 33 |
| Appearance | Clear & Very viscous | Clear & thin | Clear & thin | Clear & thin | Clear & thin | Clear & thin | Clear & thin |

Examples 15 to 18
Anionic Microemulsions

Examples 9 and 15–18 illustrate that the particle size decreases as the concentration of surfactant-catalyst in the water phase decreases, even when the concentration of the surfactant-catalyst based on the cyclosiloxane is decreasing, i.e., weight parts DBSA per 100 parts D4.

Each example followed the same procedure and was carried out using the same reaction temperature as Example 1, but the formulations in each example differed, and this is shown in Table 3. Particle size was measured using the NICOMP model 370 Particle Sizer in Distribution Analysis Volume weighted mode and in the Intensity weighted Gaussian analysis mode. The particle size distribution in Example 18 was bimodal including a 91 percent volume of particle size 0.019 micron/19 nanometer, and a second population at 9 percent volume with particle size of 0.044 micron/44 nanometer.

TABLE 3

| | Example | | | | |
|---|---|---|---|---|---|
| | 9 | 15 | 16 | 17 | 18 |
| Weight D4, gram | 175.0 | 175.0 | 175.0 | 175.0 | 175.0 |
| Weight DBSA gram | 175.0 | 140.0 | 105.0 | 70.0 | 35.0 |
| Weight of water gram | 350.0 | 385.0 | 420.0 | 455 | 490.0 |
| Wt. Parts of D4 | 100 | 100 | 100 | 100 | 100 |
| Wt. Parts DBSA | 100 | 80 | 60 | 40 | 20 |
| Wt. Parts Water | 200 | 220 | 240 | 260 | 280 |
| Ratio DBSA/D4 | 1.0 | 0.8 | 0.6 | 0.4 | 0.2 |
| Percent DBSA in the water phase | 33.3 | 26.7 | 20.0 | 13.3 | 6.7 |
| Particle size, nanometer | | | | | |
| Volume mode | 61 | 48 | 37 | 26 | 19 |
| Intensity mode | 65 | 51 | 38 | 28 | 30 |
| Appearance | Clear & Very viscous | Clear & Very viscous | Clear & thin | Clear & thin | Clear & thin |

Examples 19–26 and Comparison Example 1
Anionic Emulsions

Examples 19–26 illustrate the effect of using an electrolyte to increase the resulting particle size during emulsion polymerization. The effect is shown in Table 4. Examples 19–23 used the salts sodium chloride and calcium chloride. Examples 24 and 25 used hydrochloric acid and sulfuric acid respectively, which under conditions of in situ ion exchange with a suitable anionic surfactant, form a surfcat and could be used as a catalyst, but in Examples 24 and 25, the acids were used in order to function only as an electrolytes to control the particle size. This should be apparent by reference to Example 19 in comparison. The aqueous molar concentration of the acid correlates in each instance with the aqueous molar concentration of the salts in their effect on the particle size.

In Table 5, Comparison Example 1 is a modification of Examples 1 and 19 in which the amount of DBSA was decreased and the amount of water increased to cause a decreased particle size. Comparison Example 1 became too viscous to stir with the equipment being used after one hour of reaction and the process was terminated. It appeared however to have a bimodal particle size distribution with the major population having an average size approaching 0.006 micron/6 nanometer.

Example 26 illustrates the use of HCl as an electrolyte to increase the particle size and prevent a high viscosity. The particle size distribution of Example 26 was mono-modal and narrow. It had a mean number average diameter m(n) of 0.039 micron/39.0 nanometer and a mean volume average diameter m(v) of 0.0408 micron/40.8 nanometer, with a polydispersity m(v)/m(n) of 1.05.

Each example followed the same procedure using the same reaction temperature as in Example 1, except the formulations in each example differed, and this difference is shown in each of the Tables 4 and 5. Particle size was measured using the NICOMP model 370 Particle Sizer in Distribution Analysis Volume weighted mode and in the Intensity weighted Gaussian analysis mode.

In Tables 4 and 5, the aqueous phase was considered as the total grams of DBSA, water, and the electrolyte, and its density was one gram per milliliter. In Table 4, HCl was added as 1.75 gram of a concentrated 36 percent aqueous HCl solution, whereas in Table 5, 5.25 gram was used.

Surfcats containing alkyl groups Rv which are C12 and C13 containing groups provide the optimum in effectiveness in order to decrease particle, whereas larger alkyl groups Rv

TABLE 4

| | Example | | | | | | |
|---|---|---|---|---|---|---|---|
| | 19 | 20 | 21 | 22 | 23 | 24 | 25 |
| Weight D4 gram | 210.0 | 105.0 | 105.0 | 105.0 | 105.0 | 105.0 | 105.0 |
| Weight DBSA gram | 70.0 | 35.0 | 35.0 | 35.0 | 35.0 | 35.0 | 35.0 |
| Weight water, gram | 420.0 | 208.25 | 206.5 | 204.75 | 208.3 | 208.25 | 208.25 |
| Weight of electrolyte in gram | None | 1.75 | 3.50 | 5.25 | 3.32 | 0.63 | 1.75 |
| Electrolyte | None | NaCl | NaCl | NaCl | $CaCl_2$ | HCl | $H_2SO_4$ |
| Weight Parts D4 | 100 | 100 | 100 | 100 | 100 | 100 | 100 |
| Weight Parts DBSA | 33.3 | 33.3 | 33.3 | 33.3 | 33.3 | 33.3 | 33.3 |
| Weight Parts Water | 200 | 198.3 | 196.7 | 195 | 198.3 | 198.3 | 198.3 |
| Wt. Parts electrolyte | None | 1.67 | 3.33 | 5.00 | 3.16 | 0.60 | 1.67 |
| Electrolyte as mol per liter in aq. phase | 0 | 0.12 | 0.24 | 0.37 | 0.12 | 0.071 | 0.073 |
| Particle size, nm | | | | | | | |
| Volume mode | 26 | 32 | 39 | 46 | 116 | 31 | 30 |
| Intensity mode | 28 | 33 | 40 | 49 | 119 | 32 | 31 |
| Appearance | Clear & thin | Clear & thin | Clear & thin | Clear & thin | White | Clear & thin | |

TABLE 5

| Example | 1 | 19 | Comparison 1 | 26 |
|---|---|---|---|---|
| Weight D4, gram | 210.0 | 210.0 | 210.0 | 105.0 |
| Weight DBSA, gram | 105.0 | 70.0 | 35.0 | 21.0 |
| Weight water, gram | 385.0 | 420.0 | 455.0 | 222.3 |
| Wt. electrolyte, gram | None | None | None | 1.89 |
| Electrolyte | None | None | None | HCl |
| Weight Parts D4 | 100 | 100 | 100 | 100 |
| Weight Parts DBSA | 50.0 | 33.3 | 16.7 | 20.0 |
| Weight Parts Water | 183.3 | 200 | 216.7 | 214.9 |
| Wt. Parts electrolyte | | | | 1.8 |
| Electrolyte, mol/liter in aq. ph. | 0 | 0 | 0 | 0.208 |
| Particle size, nm | | | | |
| Volume mode | | 26 | 6 (99.9%) | 40.4 |
| Intensity mode | 40 | 28 | 29 | 42.6 |
| Appearance | Clear, thin | Clear, thin | Too viscous to stir | Clear, thin |

Examples 27 to 31
Anionic Emulsions

Examples 27–31 illustrate the use of surfcat molecular structures to control the polymer particle size during emulsion polymerization, and this feature is shown in Table 6.

In these examples, the surfcat was an alkylbenzene sulfonic acid of the type $R^v\Phi SO_3H$ where the alkyl group $R^v$ increased from C12 to C20, with the exception of Example 31 where the surfcat was dinonyl naphthalene sulfonic acid $(C_9H_{19})_2NpSO_3H$. The increasing hydrophobic nature of surfcats is indicated in Table 6 relative to the total number of carbon atoms in each surfcat.

result in larger particle size. It is expected that a decrease of the alkyl group Rv size below about C12 would provide the reverse trend due to a decrease in surface activity, and the result would be that the particle size would increase. However, the opposite trend can be seen by comparing Example 32 with Comparison Example 2 in Table 7.

Each example followed the same procedure and used the same reaction temperature as in Example 1, but the formulations in each instance were different, and this difference is shown in Table 6. The D4 component was fed to the reaction medium over a period of about 45 minutes and the total reaction time was 3 hours. Particle size was measured using the NICOMP model 370 Particle Sizer in the Intensity weighted Gaussian analysis mode.

The particular surfcats used in each of Examples 27–31 were respectively, products marketed commercially under the names BIO-SOFT S-100 by Stepan Company, Northfield, Ill.; CALSOFT LAS 99 13 by Pilot Chemical Company of Santa Fe Springs, Calif.; ARISTONIC ACID L containing 85 percent of active ingredient, a product of Pilot Chemical Company; ARISTONIC ACID H containing 85 percent of active ingredient, a product of Pilot Chemical Company; and NACURE® 1052 containing 50 percent of active ingredient in heptane, a name and product of King Industries Inc., Norwalk, Conn.

TABLE 6

| | Example | | | | |
|---|---|---|---|---|---|
| | 27 | 28 | 29 | 30 | 31 |
| Weight D4 gram | 175.0 | 175.0 | 175.0 | 175.0 | 175.0 |
| Weight surfcat, g | 35.0 | 35.0 | 41.16 | 41.16 | 70.0 |
| Weight water, gram | 490 | 490 | 490 | 490 | 490 |
| Surfcat | $C12\Phi SO_3H$ | $C13\Phi SO_3H$ | $C16\Phi SO_3H$ | $C20\Phi SO_3H$ | (C9) 2NpSO3H |
| Weight Parts D4 | 100 | 100 | 100 | 100 | 100 |
| Wt Parts of 100% surfcat | 20 | 20 | 20 | 20 | 20 |
| Weight Parts Water | 280 | 280 | 280 | 280 | 280 |
| Surfcat carbon # | 18 | 19 | 22 | 26 | 28 |
| Particle size, nm Intensity mode | 39 | 39 | 101 | 195 | 282 |

Example 32 and Comparison Example 2

Cationic Emulsions

Example 32 and Comparison Example 2 further illustrate the use of a surfcat in order to control the polymer particle size during emulsion polymerization, and the effect is shown in Table 7. In these examples, the surfcat was an n-alkyl trimethyl ammonium hydroxide formed in situ by ion exchange between sodium hydroxide as the catalyst and an n-alkyl trimethyl ammonium chloride as the cationic surfactant.

Example 32 and Comparison Example 2 followed the same procedure and used the same reaction temperature as in Example 3, but the formulations were different and this is shown in Table 7. Particle size was measured using the Microtrac Model UPA 150 Particle Sizer.

In particular, Comparison Example 2 used cetyl trimethyl ammonium chloride (CTAC), and the material in the reactor became a gel like mass only 15 minutes after the catalyst had been added. As a result, the reaction could not be continued. It is believed this process failed because the polymer particle size which was produced was too small. It was found that a change in the surfactant structure to one that was less surface active surfactant, i.e., by the equal weight substitution of lauryl trimethyl ammonium chloride (LTAC) for CTAC, resulted in the production of a larger particle size, and a relative lowering of the viscosity of the reaction medium during the process. The particle size distribution in Example 32 was found to be mono-modal and narrow. It had a mean number average diameter m(n) of 0.093 micron/93.0 nanometer, a mean volume average diameter m(v) of 0.0867 micron/86.7 nanometer, and a polydispersity m(v)/m(n) of 1.07.

The cationic surfactants used to prepare the surfcats used in Comparison Example 2 and in Example 32 were respectively commercial products marketed by Akzo Chemicals Inc. of Chicago, Ill., under their name ARQUAD 16–29 as a solution containing 29 percent of the active ingredient in water, and ARQUAD 12–37 as a solution containing 37 percent of the active ingredient in water.

TABLE 7

| Example | Comparison 2 | 32 |
|---|---|---|
| Temperature, ° C. | 95 | 95 |
| Weight D4, gram | 175.0 | 175.0 |
| Weight surfactant, gram | 134.12 | 105.14 |
| Weight of water, gram | 79.8 | 108.78 |
| Weight of NaOH, gram | 1.05 | 1.05 |
| Surfactant | CTAC | LTAC |
| Weight Parts of D4 | 100 | 100 |
| Weight Parts of 100% surfactant | 22.2 | 22.2 |
| Weight Parts of Water | 100 total | 100 total |
| Surfcat alkyl group carbon number | 16 | 12 |
| Particle size, nm D (v) | 18 (85% vol) | 92 |

Examples 33 and 34, and Reference Examples 1–3 which Correspond to Examples 1–3 of U.S. Pat. No. 4,999,398

Anionic Microemulsions

Examples 33 and 34 illustrate use of the method of this invention for the control of the resulting polymer particle size during emulsion polymerization, and this is shown in Table 8. These examples successfully produced transparent microemulsions without emulsifying the cyclosiloxane. They demonstrate a solution to the problem illustrated in Examples 1 and 2 of U.S. Pat. No. 4,999,398 in which the cyclosiloxane did not successfully emulsion polymerize.

Examples 33 and 34 follow the same procedure as Example 1, but the formulations differ, and this is shown in Table 8. Particle size was measured using the Microtrac Model UPA-150 Particle Sizer.

The emulsion polymerization of Reference Example 1 could not be continued after one hour of reaction at 85° C. because it acquired a gelatinous consistency and could not be stirred as a consequence. Example 33 on the other hand, had essentially the same composition, i.e., 34.5 percent versus 35.0 percent of cyclosiloxane D4 and 13.8 percent versus 15.0 percent of DBSA respectively, and could be successfully completed by the use of a higher reaction temperature. It is believed that this temperature modification increased the particle size, and consequently reduced the viscosity during the reaction.

Reference Example 2 contained twice the amount of water relative to the amount of cyclosiloxane in comparison to Reference Example 1, apparently for dilution and to prevent thickening. It did not gel or become too viscous to stir. However, Reference Example 2 did not successfully produce a clear microemulsion. Instead, Reference Example 2 provided a bimodal particle size distribution which consisted of a population of particles less than 0.12 microns/120 nanometer, and a large portion of larger droplets which separated as a surface layer of an unemulsified polyorganosiloxane oil after 2 days of aging.

Reference Example 3 used a controlled feed to the reaction medium of an already prepared emulsion of cyclosiloxane, and it successfully provided a clear microemulsion. However, Example 34 demonstrates that such clear microemulsions can also be prepared according to this invention without use of a pre-emulsion. It was also determined that the microemulsion of Example 34 was superior to that prepared in Reference Example 3 because it contained a smaller particle size and higher content of silicone polymer.

have a structure which can be represented generally by the formula

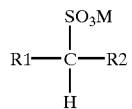

in which R1 and R2 are alkyl groups containing 1–20 carbon atoms, i.e., $CH_3$ to $C_{20}H_{41}$, and M is sodium, potassium, or an ammonium ion.

The hydrogen ion exchange resin used in protonating HOSTAPUR SAS 60 was a cationic exchange resin having sulfonic acid active groups which is sold under the name DOWEX® HGR-W2 by The Dow Chemical Company, Midland, Mich. As a result of exchanging sodium in an exchange reaction between HOSTAPUR SAS 60 and DOWEX® HGR-W2 hydrogen ion exchange resin, one obtains the composition represented by:

TABLE 8

| Example | Ref. 1 | Ref. 2 | Ref. 3 | 33 | 34 |
|---|---|---|---|---|---|
| Temp. °C. | 85 | 85 | 85 | 95 | 85 |
| Weight D4, gram | 200 | 50 | 40 | 210 | 210 |
| Weight DBSA, gram | 80 | 20 | 3 + 13 | 90 | 105 |
| Weight of water, g | 300 | 150 | 57 + 87 | 300 | 385 |
| Weight Parts D4 | 100 | 100 | 100 | 100 | 100 |
| Weight Parts DBSA | 40 | 40 | 40 | 42.9 | 50 |
| Wt. Parts Water | 150 | 300 | 360 | 142.9 | 183.3 |
| % DBSA in water | | | | 23.0 | 21.4 |
| Particle size, nm Intensity mode | | | 45 | 44 | 30 |
| Appearance | Had a gel consistency after one hour | Thin but bimodal particle size | Clear and 20% silicone | Very viscous, still mixing, 35% silicone | Clear and 30% silicone |

The following additional examples are set forth in order to illustrate the invention in yet more detail.

Examples 35 to 37
Anionic Microemulsions

As in Example 1, these examples illustrate a typical procedure according to this invention where the cyclosiloxane is held out of the mixture (I) until mixture (I) has been heated to the desired reaction temperature, except that in these examples a surfcat is produced from an anionic surfactant and a cation exchange resin prior to addition to the initial mixture.

Prior to use as described below, a secondary alkane sulfonate was converted to a secondary alkane sulfonic acid by an ion exchange of the sodium atom of the sodium secondary alkane sulfonate with a hydrogen ion exchange resin. The particular secondary alkane sulfonate (SAS) used in this general procedure was HOSTAPUR SAS 60, a sodium salt of a secondary alkane sulfonate, as noted above. Secondary alkane sulfonates such as HOSTAPUR SAS 60

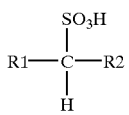

where R1 and R2 have the same meaning as defined above.

The surfactant solution A in Table 9 was prepared by adding 310 ml of DOWEX® HGR-W2 hydrogen exchange resin to two liters of a 10 percent solution of the sodium secondary alkane sulfonate HOSTAPUR SAS 60 in water. The resin was suspended for five minutes in a glass flask with mild agitation. The agitation was stopped, the resin was allowed to settle, and the acidic liquor was decanted from the resin. The single surfactant solution B was prepared by the same procedure as surfactant solutions A except that one liter of a five percent sodium secondary alkane sulfonate solution was treated with 80 ml of the hydrogen exchange resin.

Three microemulsions were prepared using the same general procedure for each emulsion. The amount of each of the ingredients used in this general procedure are shown below in Table 9. According to the general procedure, (i) deionized water and (ii) an aqueous solution of a secondary alkane sulfonic acid (HSAS) were added to a one liter, three-necked, round bottom flask, equipped with a glass stirring rod having a TEFLON® paddle, a stopper, a condenser, and a temperature probe.

The stirring mechanism was set to rotate at 300 rpm, and the temperature was adjusted to 70° C. using a temperature controller and a heating mantle. Once the temperature had stabilized at 70° C., octamethylcyclotetrasiloxane monomer was fed into the flask over a period of about one hour using a peristaltic pump. The polymerization reaction was allowed to continue for 8 hours after feeding of the octamethylcyclotetrasiloxane monomer had started. Triethanolamine as a solution containing 85 percent by weight of the active ingredient in water was added to neutralize each emulsion to a pH of about 7. The volume-weighted mean particle size of the siloxane polymer in each microemulsion was determined and is shown in Table 9. The particle size was measured using a MICROTRAC UPA-150 Particle Sizer. The microemulsion from Example 35 was then tested and determined to be freeze/thaw stable over 5 cycles. This is a particularly useful aspect of the invention in that these microemulsions were freeze/thaw stable without the addition of a nonionic surfactant, glycol, or other freeze/thaw additive, typically required at copious levels in order to achieve sufficient stability.

TABLE 9

|  | Example | | |
| --- | --- | --- | --- |
|  | 35 | 36 | 37 |
| Weight of D4, gram | 50 | 50 | 25 |
| Weight SAS solution, gram | 400 (A) | 250 (A) | 400 (B) |
| Weight of water, gram | 50 | 200 | 75 |
| Weight Parts D4 | 100 | 100 | 100 |
| Weight Parts SAS | 75 | 47 | 75 |
| Weight Parts Water | 825 | 853 | 1825 |
| Ratio of SAS/D4 | 0.75 | 0.47 | 0.75 |
| % SAS in the water phase | 8.3 | 5.2 | 3.9 |
| Volume-weighted mean particle size, nanometer | 31 | 21 | 15 |

It can be seen in Table 9 that at a constant level of silicone, i.e., 100 parts, the polymer particle size decreased correspondingly with a decrease in the surfactant concentration in the aqueous phase. This is an opposite effect to the effect illustrated in Comparative Examples 38–41 shown below.

Examples 38 to 41—Comparative Examples

In these Comparative Examples, all percentages of ingredients used are by weight. Thus, several emulsions containing the monomer octamethylcyclotetrasiloxane were prepared by passing mixtures containing (i) 20 percent of the monomer, (ii) variable levels of sodium dodecylbenzenesulfonate, i.e., 0.02 percent, 0.5 percent, 1.5 percent, and 4.5 percent, and (iii) water, through a homogenizer, three times at a pressure of 4,000 pounds per square inch. The mean particle size of the monomer present in each of these emulsions was approximately 0.5 micron/500 nanometer, as determined by optical microscopy. Then 200 gram of each of the cyclosiloxane emulsions were added to a 300 milliliter glass flask, heated to 60° C. while mixing, and then 10 gram of an aqueous solution containing 10 percent by weight of dodecylbenzene sulfonic acid was added to each flask to catalyze the ring opening polymerization reaction. The reactions were allowed to continue for a period of about two days at a temperature of 60° C., and then the flask was allowed to cool to ambient temperature. An amount of 25 gram of each of the resulting acidic emulsions was diluted with 75 gram of water, and then 3.4 gram of methyltrimethoxysilane $CH_3Si(OCH_3)_3$ was added over a period of 1–2 hours to harden the emulsion particles. The particle size of the polymer present in each emulsion was determined by electron microscopy. The results obtained are shown in Table 10.

TABLE 10

|  | Example | | | |
| --- | --- | --- | --- | --- |
|  | 38 | 39 | 40 | 41 |
| Weight of D4, gram | 40 | 40 | 40 | 40 |
| Weight of 10% DBSA solution, gram | 10 | 10 | 10 | 10 |
| Weight of Na salt of DBSA, gram | 0.04 | 1.0 | 3.0 | 9.0 |
| Weight of water, gram | 159.96 | 159.0 | 157.0 | 151.0 |
| Weight Parts of D4 | 100 | 100 | 100 | 100 |
| Weight Parts of DBSA | 2.5 | 2.5 | 2.5 | 2.5 |
| Weight Parts of Na Salt of DBSA | 0.1 | 2.5 | 7.5 | 22.5 |
| Weight Parts of Water | 422.4 | 420.0 | 415.0 | 400.0 |
| Ratio of Total Surfactant/D4 | 0.026 | 0.05 | 0.1 | 0.25 |
| % Total Surfactant in Water Phase | 0.61 | 1.18 | 2.35 | 5.88 |
| Polymer Particle Size Range, nanometer | 46–244 | 25–225 | 18–150 | 16–125 |

In Table 10, the percent total surfactant in the water phase is the combined amounts of sodium dodecylbenzenesulfonate and dodecylbenzene sulfonic acid. It can be seen that at a constant level of silicone, i.e., 100 parts, the polymer particle size decreased correspondingly with an increase in the surfactant concentration in the aqueous phase. This is opposite to the effect observed in Examples 15–18 and 35–37, and is typical of the effect known and expected in the emulsion art. It should be noted that the aqueous phase concentrations of surfactant in Comparative Examples 38–41 are lower than those in Examples 15–18 where essentially the same surfactants were used. It is believed that this illustrates the opposite trends of particle size produced when the surfactant aqueous concentrations are below and above, respectively, the concentration Cmax as described in this invention.

Emulsions prepared according to this invention are useful in paper coating, textile coating, and home care applications for delivering silicone polymers to various surfaces and substrates. They can also be used to deliver silicone polymers of tailored Theological properties to the human body, i.e., as in shampoo bases to provide styling and conditioning benefits to hair, or as a delivery mechanism for use in the care of skin.

Compositions found to be most useful according to this invention generally comprise emulsions and microemulsions containing the siloxane polymer having an average particle diameter of less than about 1 micron/1,000 nanometer, preferably less than about 0.14 micron/140 nanometer, respectively.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. An emulsion polymerization process for preparing emulsions containing particles of siloxane polymer comprising:
   (i) forming a mixture by combining a siloxane oligomer, an anionic surfactant, no nonionic surfactant, and water; (ii) agitating the mixture without the use of high shear mixing to form droplets of oligomer prior to polymerization which have an average diameter of greater than 10 micron/10,000 nanometer; (iii) adding a siloxane polymerization catalyst, which is capable of cleaving siloxane bonds, to the oligomer mixture; and (iv) polymerizing the oligomer to form a polymer until the polymer has polymerized to the desired viscosity or molecular weight, wherein the polymerization process is performed without the use of high shear mixing.

2. A process according to claim 1 in which the oligomer has the formula

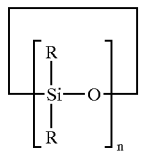

where each R is a saturated or unsaturated alkyl group of 1–6 carbon atoms, an aryl group of 6–10 carbon atoms, and n is 3–7.

3. A process according to claim 2 in which the oligomer is a composition selected from the group consisting of hexamethylcyclotrisiloxane, octamethylcyclotetrasiloxane, decamethylcyclopentasiloxane, tetramethyltetravinylcyclotetrasiloxane, tetramethyltetraphenylcyclotetrasiloxane, and mixtures thereof.

4. An emulsion polymerization process for preparing emulsions containing particles of siloxane polymer comprising:
   (i) forming a mixture by combining a siloxane oligomer, a strong acid, no nonionic surfactant, and water; (ii) agitating the mixture without the use of high shear mixing to form droplets of oligomer prior to polymerization which have an average diameter of greater than 10 micron/10,000 nanometer; (iii) adding a siloxane polymerization catalyst, which is capable of cleaving siloxane bonds, to the oligomer mixture; and (iv) polymerizing the oligomer to form a polymer until thepolyme3r has polymerized to the desired viscosity or molecular weight, wherein the polymerization process is performed without the use of high shear mixing.

5. A process according to claim 4 in which the oligomer has the formula

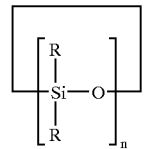

where each R is a saturated or unsaturated alkyl group of 1–6 carbon atoms, an aryl group of 6–10 carbon atoms, and n is 3–7.

6. A process according to claim 5 in which the oligomer is a composition selected from the group consisting of hexamethylcyclotrisiloxane, octamethylcyclotetrasiloxane, decamethylcyclopentasiloxane, tetramethyltetravinylcyclotetrasiloxane, tetramethyltetrapphenylcyclotetrasiloxane, and mixtures thereof.

* * * * *